H. T. THOMAS.
STARTING MECHANISM.
APPLICATION FILED JAN. 11, 1913.
1,144,010.
Patented June 22, 1915.
3 SHEETS—SHEET 3.
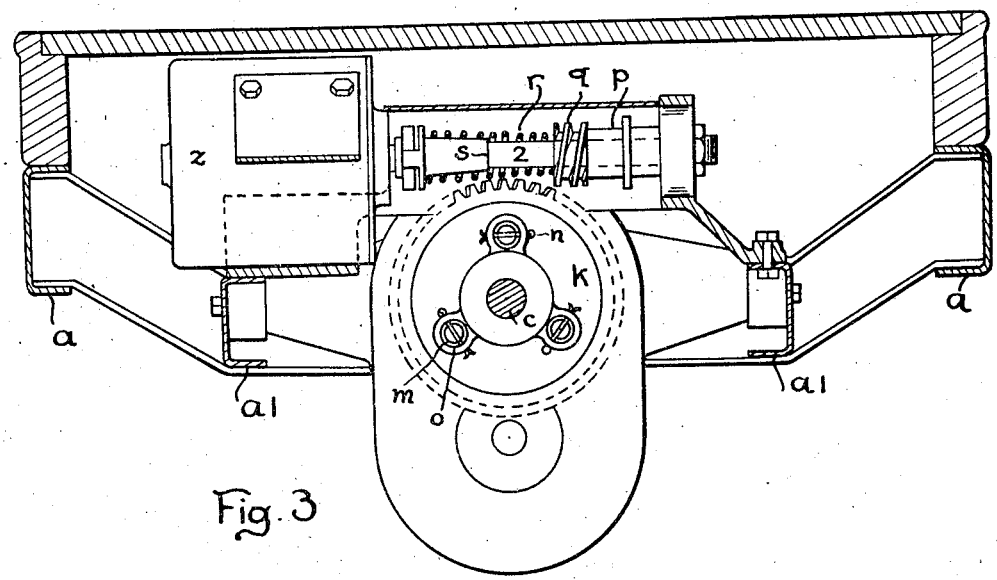
Fig. 3
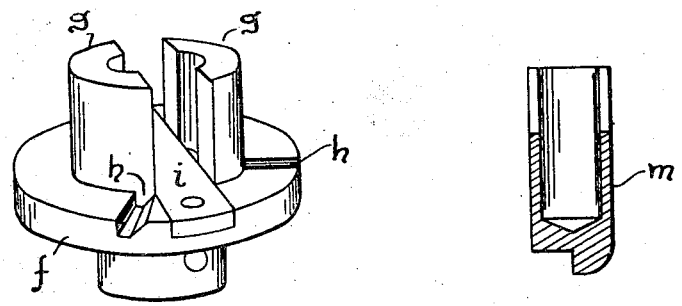
Fig. 4
Fig. 5
WITNESSES
Robert N. Van Dstrido
Virginia C. Spratt.
INVENTOR
Horace T. Thomas
BY
Ralgemond A. Parker
ATTORNEY

UNITED STATES PATENT OFFICE.

HORACE T. THOMAS, OF LANSING, MICHIGAN, ASSIGNOR TO REO MOTOR CAR CO., OF LANSING, MICHIGAN, A CORPORATION OF MICHIGAN.

STARTING MECHANISM.

1,144,010. Specification of Letters Patent. Patented June 22, 1915.

Application filed January 11, 1913. Serial No. 741,408.

*To all whom it may concern:*

Be it known that I, HORACE T. THOMAS, a citizen of the United States, residing at Lansing, county of Ingham, State of Michigan, have invented a certain new and useful Improvement in Starting Mechanism, and declare the following to be a full, clear, and exact description of the same, such as will enable others skilled in the art to which it pertains to make and use the same, reference being had to the accompanying drawings, which form a part of this specification.

My invention relates to a starting device for internal combustion engines and consists in the improvements hereinafter described and pointed out in the claims.

Figure 1:
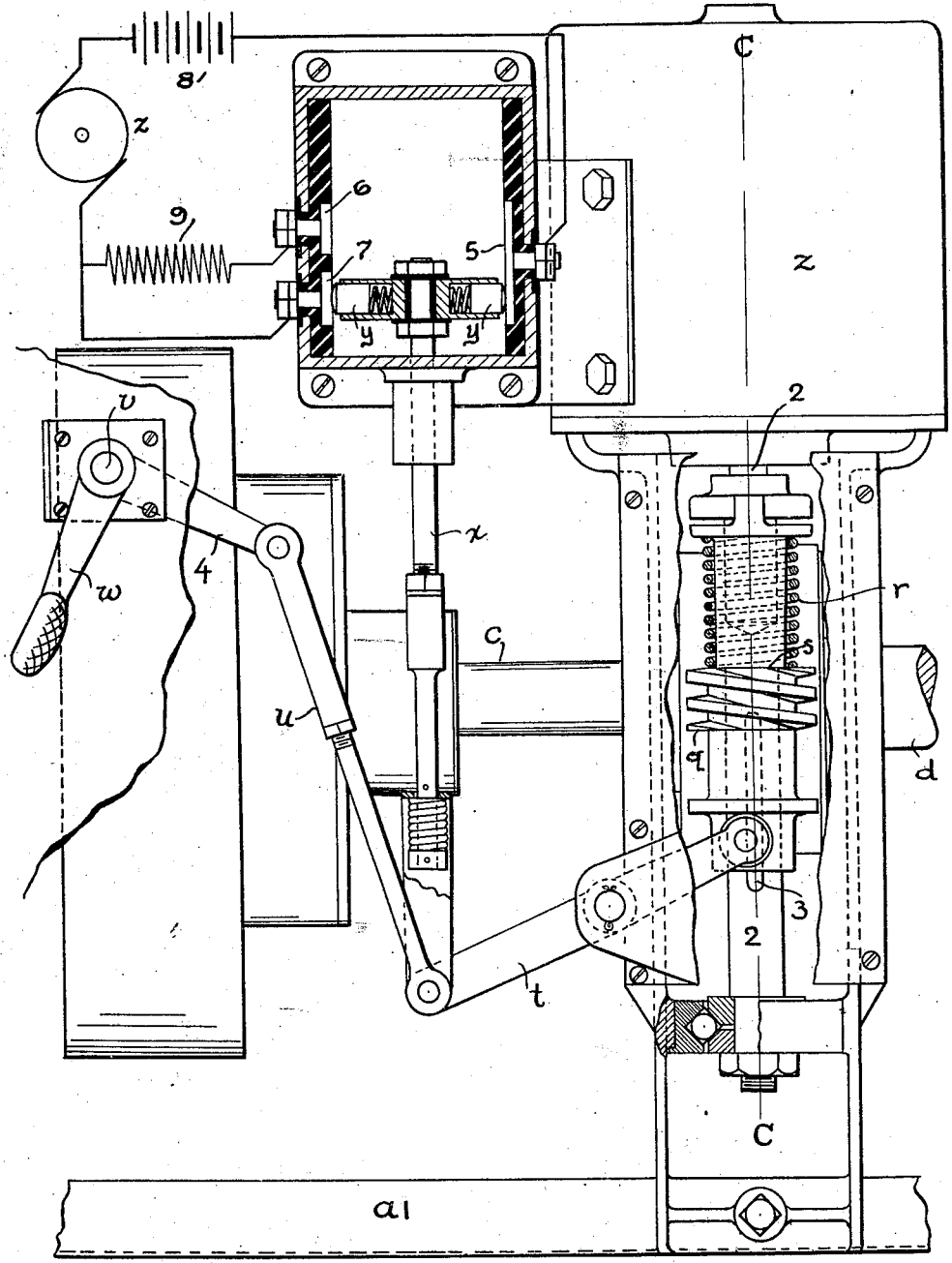
Figure 2:
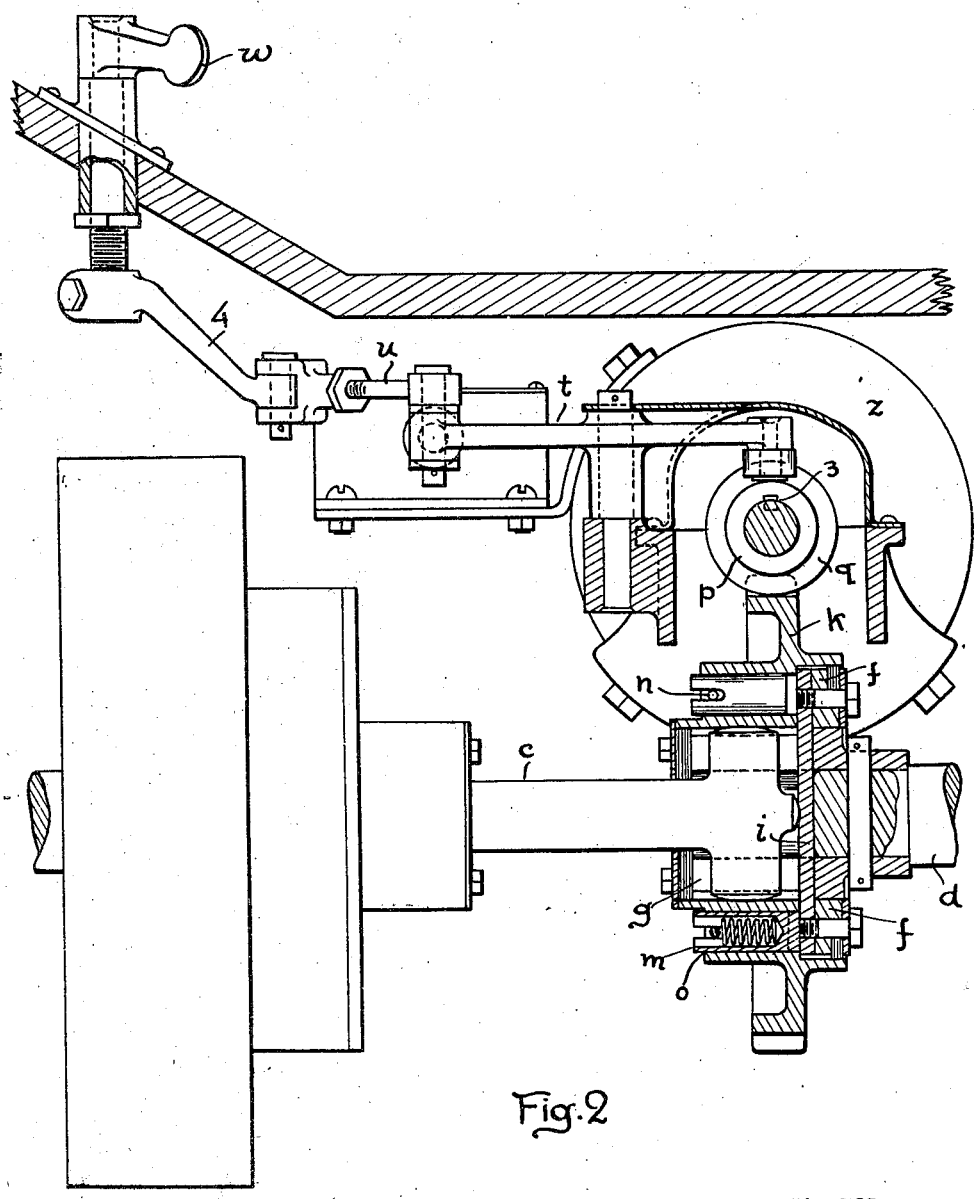

In the accompanying drawings: Figure 1, is a plan view, partly broken away, of a mechanism embodying my invention, applied upon an automobile and showing adjacent parts of the automobile. Fig. 2, is a side elevation of the same, partly in section. Fig. 3, is an elevation partly in section on the line C—C Fig. 1, looking from the left of the plane of section. Fig. 4, is a detail perspective view of one of the parts. Fig. 5, is a sectional detail view of a pawl.

$a$, $a$ are the side pieces of the chassis of an automobile.

$a^1$, $a^1$ are the stringers, or side pieces, of a subframe upon which the change-speed gearing and bearings for parts of the transmission mechanism are located.

$c$, is part of the transmission shaft adjacent to the engine and $d$ is the part of the said shaft more remote from the engine. The parts $c$ and $d$ engage by a universal joint of a usual form consisting of jaws $g$, $g$ upon the shaft $d$ and laterally extending lugs, or projections, forming a T at the end of the shaft $c$ (Fig. 2). Upon the shaft $d$ at the base of the jaws $g$, $g$ (Figs. 4 and 2) is secured a ring $f$ in one surface of which are formed radial slots $h$, $h$ each of which slots has a vertical and a slanting wall. The ring $f$ is secured in position by a key $i$ extending between the jaws $g$, $g$ and into slots formed in the faces of said ring and by bolts fastening the key and ring together.

$k$ is a worm wheel passing around and adapted to turn on a bearing upon the jaws $g$, $g$, its web turning with its face adjacent to the face of the ring $f$.

$m$, $m$, $m$, are pawls which consists of hollow tubular cylindrical rods (Fig. 5), the walls being slotted at their outer ends, fitting into sockets $o$, $o$ in the web of the wheel $k$, and adapted to reciprocate perpendicular to the plane of said web. There is a pin passing into the wall of said socket and through the slots in the walls of the pawls $m$ at right angles to the axis of said pawls, and there is a spring within each of said pawls (Fig. 2), its outer end bearing upon a pin $n$ and acting to press a pawl inward into engagement with the face of the ring $f$. The pawls $m$ are adapted to engage the vertical walls of the slots $h$, $h$, to carry the rod $d$ with the worm wheel $k$ when said wheel is rotated in the direction to produce a forward movement of the automobile. The shaft $d$ may, however, turn in that direction independent of the worm wheel $k$, the pawls $m$ passing by the slanting faces of the slot $h$ without engaging.

$z$ is an electric motor adapted to be run by a current from a storage battery 8 upon the vehicle to start the engine.

2 is the shaft of the motor $z$.

$p$ is a sleeve secured upon the shaft 2 by a feather 3 so as to move longitudinally thereof but to be restrained from relative angular motion.

$r$ is a spring acting to force the sleeve $p$ outward.

$s$ is a shoulder formed on the shaft 2 and adapted to limit the inward movement of the sleeve $p$.

$q$ is a worm formed upon the sleeve $p$ and adapted to engage the teeth of the worm wheel $k$ when said sleeve is in its innermost position and to be free from said wheel when said sleeve is in its outermost position.

$t$, is a pivoted lever engaging the sleeve $p$ and adapted to reciprocate the same along the shaft 2.

$u$, is a connecting rod joining one end of the lever $t$ with an operating lever 4 pivoted at $v$ in the bottom of the body of the automobile.

$w$, is a pedal by which the operating lever 4 may be oscillated to actuate the lever $t$.

$x$, is a rod jointed to the lever $t$.

$y$, $y$ are contact points on the inner end of the rod $x$.

5, 6 and 7 are contact pieces with which the points $y$, $y$ engage producing the different circuits.

8 indicates a storage battery and 9 is a resistance.

The operation of the above described device is as follows: In the normal, or inoperative, position of the parts the sleeve $p$ is at the outer end of its stroke and out of engagement with the worm wheel $k$. It is held and automatically returned to this position by the spring $r$. In this position the contact points $y, y$ are out of engagement at the outer end of their travel. Wishing to start the engine, the operator presses his foot against the pedal turning the bell-crank lever 4 oscillating the lever $t$ by means of the connecting rod $u$ and pressing the sleeve $p$ toward its inward position. In this motion, contact is first made between the plates 5 and 6 and the motor $z$ is started with a small current through the resistance 9. At this position, the worm $q$ has just begun to engage the worm wheel $k$ and the motor $z$ starting into motion draws the sleeve $p$ to its innermost position, as shown in Fig. 1, continuing the motion of the lever $t$ and drawing the contact points $y, y$ to the position shown in Fig. 1 in which the full current of the battery 8 is passed through the motor. The action of the worm $q$ forces it against the shoulder $s$ and drives the worm wheel $k$ which carries with it the transmission shaft $d$ which starts the engine through the shaft $c$. It will be noticed that the worm $q$ may always move easily into engagement with the worm wheel $k$, its threads acting like the teeth of a rack to engage the teeth of the wheel $k$, the wheel turning freely in this direction of motion.

What I claim is:—

1. In an engine starter, the combination of a worm wheel having peripheral teeth, said wheel being connected with the engine so that its rotation in one direction shall set the engine in motion, said wheel being adapted to turn freely in the other direction, a motor having a shaft, a worm having threads adapted to engage the teeth of said wheel, said worm being adapted to slide longitudinally upon, but restrained from angular motion relative to, said shaft, said worm being adapted to engage said wheel, by turning the latter in the direction of its free rotation, at one end of the travel of said worm, and to be free from said wheel at the other end of its travel, and means for reciprocating said worm to cause the engagement and disengagement thereof.

2. In an engine starter, the combination of a worm wheel having peripheral teeth, said wheel being connected with the engine so that its rotation in one direction shall set the engine in motion, said wheel being adapted to turn freely in the other direction, a motor having a shaft, a worm having threads adapted to engage the teeth of said wheel, said worm being adapted to slide longitudinally upon, but restrained from angular motion relative to, said shaft, said worm being adapted to engage said wheel by turning the latter in the direction of its free rotation, at one end of the travel of said worm, and to be free from said wheel at the other end of its travel, and means for reciprocating said worm to cause the engagement and disengagement thereof, and a spring acting to retract said worm.

In testimony whereof, I sign this specification in the presence of two witnesses.

HORACE T. THOMAS.

Witnesses:
  DONALD E. BATES,
  DEAN M. PARSONS.